(12) United States Patent
Miranda et al.

(10) Patent No.: US 7,162,591 B1
(45) Date of Patent: Jan. 9, 2007

(54) PROCESSOR MEMORY HAVING A DEDICATED PORT

(75) Inventors: Tracy Miranda, High Wycombe (GB); Steven Perry, Wycombe (GB)

(73) Assignee: Altera Corporation, San Jose, CA (US)

( * ) Notice: Subject to any disclaimer, the term of this patent is extended or adjusted under 35 U.S.C. 154(b) by 315 days.

(21) Appl. No.: 10/753,052

(22) Filed: Jan. 6, 2004

(51) Int. Cl.
*G06F 12/00* (2006.01)
*G06F 13/00* (2006.01)

(52) U.S. Cl. .................. 711/149; 711/5; 711/131; 711/148; 711/150; 710/36; 710/107

(58) Field of Classification Search .............. None
See application file for complete search history.

(56) References Cited

U.S. PATENT DOCUMENTS

| | | | |
|---|---|---|---|
| 6,122,706 A * | 9/2000 | Leong et al. | 711/108 |
| 6,167,487 A * | 12/2000 | Camacho et al. | 711/131 |
| 6,675,267 B1 * | 1/2004 | Rovati | 711/150 |
| 6,732,247 B1 * | 5/2004 | Berg et al. | 711/169 |
| 6,961,807 B1 * | 11/2005 | Hauck | 711/103 |

OTHER PUBLICATIONS

David A. Patterson and John L. Hennessy, Computer Architecture A Quantitative Approach, 1996, Morgan Kaufmann Publishers, Inc., Second Edition, pp. 430-438.*
EventHelix.com, "DMA and Interrupt Handling", 2000-2005, 4 pages.

* cited by examiner

*Primary Examiner*—Reginald Bragdon
*Assistant Examiner*—Shawn Gu
(74) *Attorney, Agent, or Firm*—Beyer Weaver & Thomas,LLP

(57) ABSTRACT

Methods and apparatus are provided for closely coupling a dedicated memory port to a processor core while allowing external components access to the dedicated memory. A processor core such as a processor core on a programmable chip is provided with dedicated read access to a dual ported memory. Write access is arbitrated between processor core write access and read/write access by external components. A dedicated memory port is particularly beneficial in digital signal processing applications.

29 Claims, 8 Drawing Sheets

PROCESSOR MEMORY HAVING A DEDICATED PORT

BACKGROUND OF THE INVENTION

1. Field of the Invention

The present invention relates to a system on a programmable chip. More specifically, the present invention relates to methods and apparatus for accessing a memory on a programmable chip.

2. Description of Related Art

In embedded microprocessor systems, processor performance is often supplemented by incorporating hardware accelerators to improve time-critical portions of algorithms. However, these systems usually do not come close to achieving the theoretical performance improvements. The hardware accelerator and processor need to frequently exchange data. As a result, the raw performance gain is diluted by the overhead incurred for performing often inefficient memory read or write accesses.

Generally there are three schemes for sharing and arbitrating memory in a hardware-accelerated system. In one example, the accelerator controls access to memory. In another example, memory is shared and accesses are arbitrated. In still another example, the processor controls access to memory.

If the accelerator controls accesses, then data is copied from the processor to the accelerator and back again. If the memory is shared, the processor and hardware accelerator use somewhat generic bus interfaces. This is likely to affect performance as arbitration is not optimal and is likely to be affected by other components in the system.

Consequently, it is therefore desirable to provide improved methods and apparatus for improving data access efficiency. In one example, it is desirable to provide logic and circuitry to improve read/write access efficiency of a processor memory.

SUMMARY OF THE INVENTION

Methods and apparatus are provided for closely coupling a dedicated memory port to a processor core while allowing external components access to the dedicated memory. A processor core such as a processor core on a programmable chip is provided with dedicated read access to a dual ported memory. Write access is arbitrated between processor core write access and read/write access by external components. A dedicated memory port is particularly beneficial in digital signal processing applications.

In one embodiment, a system on a programmable chip is provided. The system includes a processor core and a memory. The memory includes a dedicated port and an arbitrated port. The dedicated port is coupled to the processor core to allow direct read access by the processor core. The arbitrated port is coupled to arbitration circuitry scheduling write access by the processor core and read and write access by an external primary component associated with the programmable chip.

In another embodiment, a method for accessing memory is provided. A read access is performed to a memory associated with a processor. The read access is performed through a dedicated port. The dedicated port allows direct read access by the processor. A write access is performed to the memory associated with the processor. The write access is performed through an arbitrated port. The arbitrated port is coupled to arbitration circuitry scheduling write access by the processor and read and write access by an external primary component.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processor cores and hardware acceleration cores.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Programmable chips and particularly systems on programmable chips include processor cores and memory on-chip. In one example, a Digital Signal Processing (DSP) core is provided with on-chip program memory and on-chip data memory. Having memory on-chip allows relatively fast memory read and write access by a processor core. Any logic or mechanism supporting an instruction set is referred to herein as a processor core. In one example, a processor core is a Central Processing Unit (CPU) or a DSP core having Arithmetic Logic Units (ALUs) and Multiply Accumulate Blocks (MACs). However, in some applications, such as digital signal processing applications, accessing even an on-chip memory is not sufficiently fast. In many instances, read and write access of an on-chip memory is shared between a processor core and other components on the programmable chip. A processor may not be able to immediately perform a memory read because some other component such as an Ethernet controller may be accessing memory. Available mechanisms for accessing memory are insufficient for many applications, particularly digital signal processing applications.

Providing a closely coupled dedicated memory makes memory access deterministic. Having deterministic memory access is important for applications such as DSP and streaming applications. Available mechanisms for accessing on-chip memory are often insufficient because available mechanisms depend on how many other components are in a system. For example, an increased number of primary components in a system increases the complexity of a bus or interconnect fabric which may affect system performance.

Figure 1:
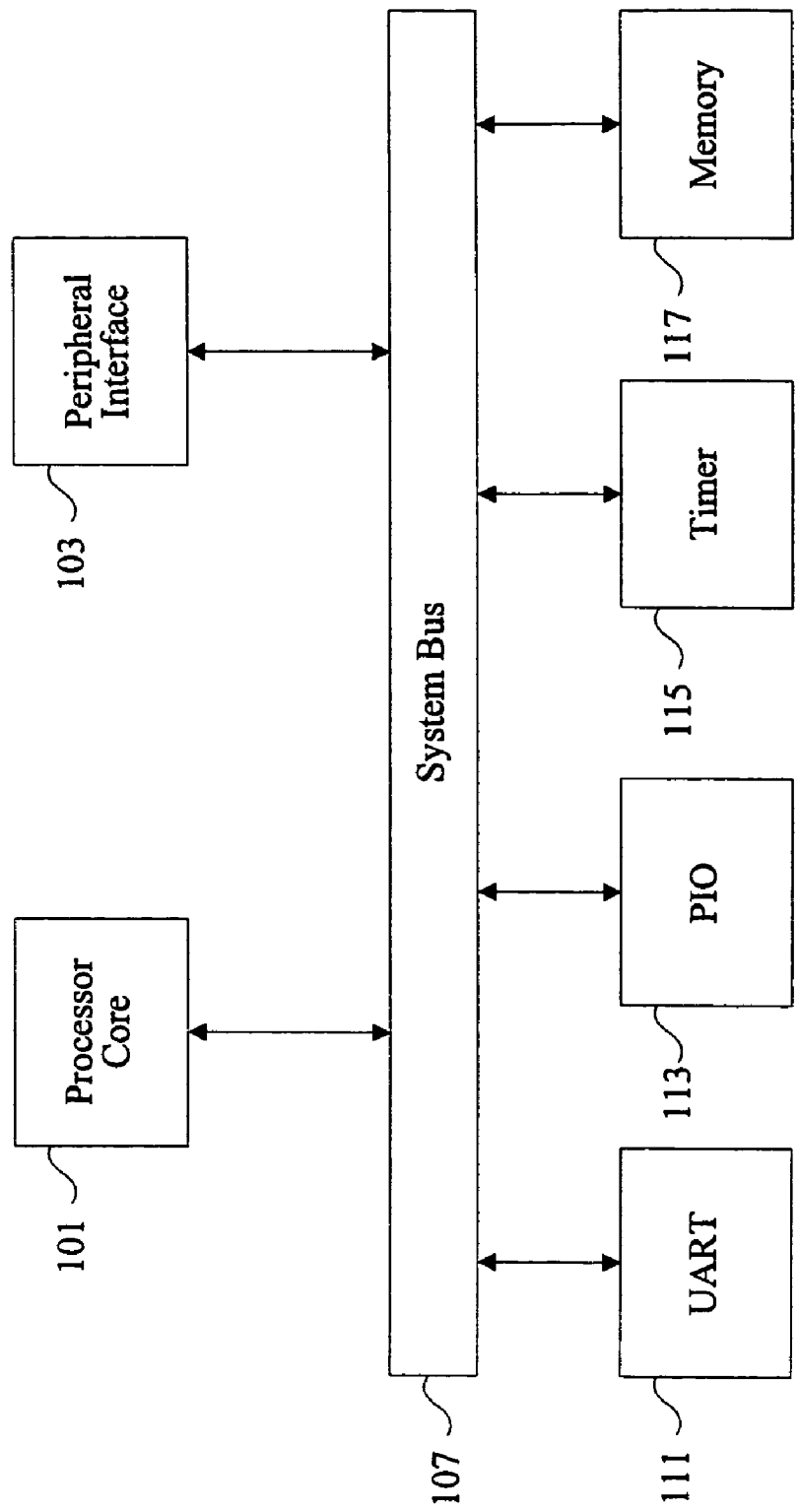
FIG. 1 is a diagrammatic representation showing a system with on-chip memory.

FIG. 1 is a diagrammatic representation showing one example of a system on a programmable chip having a processor core and a memory shared by multiple components. The system on a programmable chip includes processor core 101 and a peripheral interface 103 as well as peripheral components UART 111, PIO 113, timer 115, and memory 117. In another example, the system includes only a DSP core and memory. A variety of both on-chip and off-chip components can be used. In some instances, a system on a programmable chip also includes a digital signal processing core or an MPEG accelerator core. The peripheral interface 103 included is a memory controller with an associated bus bridge connected to off-chip memory. It should be noted that the system can include both on-chip and off-chip memory.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

As noted above, the programmable chip includes a memory 117 that is accessible by the processor core as well as external components. Any on-chip or off-chip component sharing access of a memory with a processor core is referred to herein as an external component.

Figure 2:
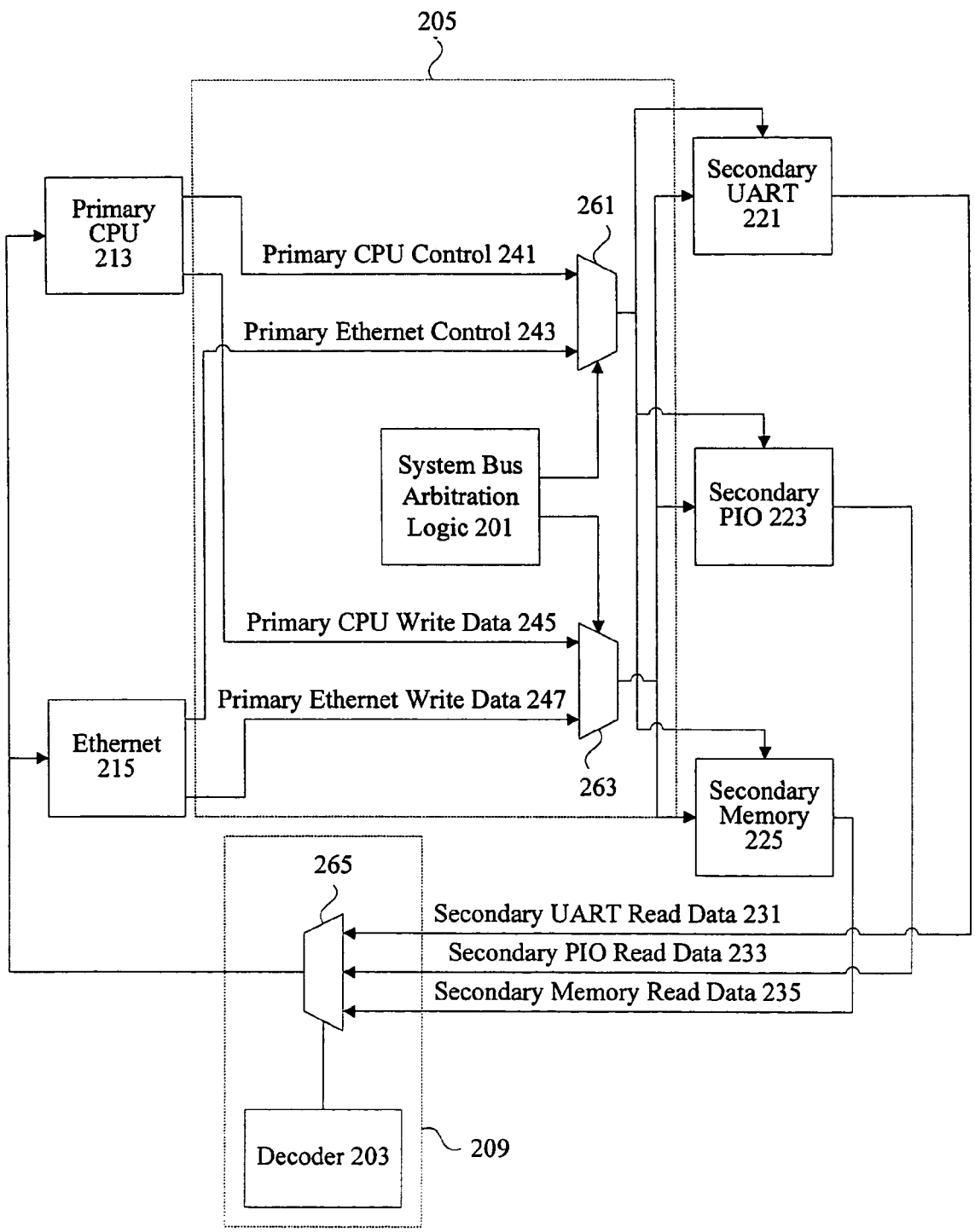
FIG. 2 is a diagrammatic representation showing a system using a conventional bus.

FIG. 2 is a diagrammatic representation depicting a memory that is accessed by both a processor core and an Ethernet controller through a conventional bus architecture. A conventional bus architecture includes a system bus arbitrator 205. A system bus arbitrator 205 includes arbitrator switching circuitry 261 and 263 as well as system bus arbitration logic 201. Logic and mechanisms for selecting an input based on a control signal are referred to herein as arbitrator switching circuitry. It should be noted that although switching circuitry generally can be implemented using multiplexers, a variety of mechanisms including switches and transistors can be used.

Any component or device that is operable to initiate read and write operations by providing control information is referred to herein as a primary component. Primary components are sometimes referred to as master components. Control information can include a particular address associated with a secondary component. Any component or device that responds to read or write operations with information sent back to the primary component regarding the read or write operation is referred to herein as a secondary component. Secondary components are sometimes referred to as slave components. Some examples of primary components are processors, microcontrollers, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from primary system CPU.

Logic and mechanisms for providing the control signal based on criteria such as fairness or priority are referred to herein as arbitration logic. The inputs of the arbitrator switching circuitry 261 and 263 are connected to primary CPU 213 and primary Ethernet 215. The outputs of the arbitrator switching circuitry 261 and 263 are connected to secondary UART 221, secondary PIO 223, and secondary peripheral interface 225. The outputs of the secondary components transmit information such as read data back to the primary components through a decoder 209. Mechanisms for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access a memory or any given secondary component and a time. A primary component performing a read or write operation on a secondary component is referred to herein as accessing a secondary component. Multiple primary components accessing secondary components in a manner that would cause data bit collisions if performed on the same data lines is referred to herein as accessing secondary components at the same time.

In one example, an Ethernet device is accessing a memory secondary PIO. While the Ethernet device is accessing the secondary PIO, a processor can not access an SDRAM through a peripheral interrface even if both the primary streaming output device and the peripheral interface are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary component can access any one of the secondary components at any given time is referred to herein as a system bus arbitrator. Various schemes such as weighted fairness can be implemented to improve the efficiency of secondary component access, but such schemes can increase system complexity and latency. In conventional implementations, a computer system includes a single system bus arbitrator for each bus in the computer system.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip. Instead of implementing complicated bus sharing schemes, the bus itself can be eliminated to improve system performance. According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. A component such as a processor core can continuously access system memory without preventing an Ethernet controller from interacting with other devices.

Figure 3:
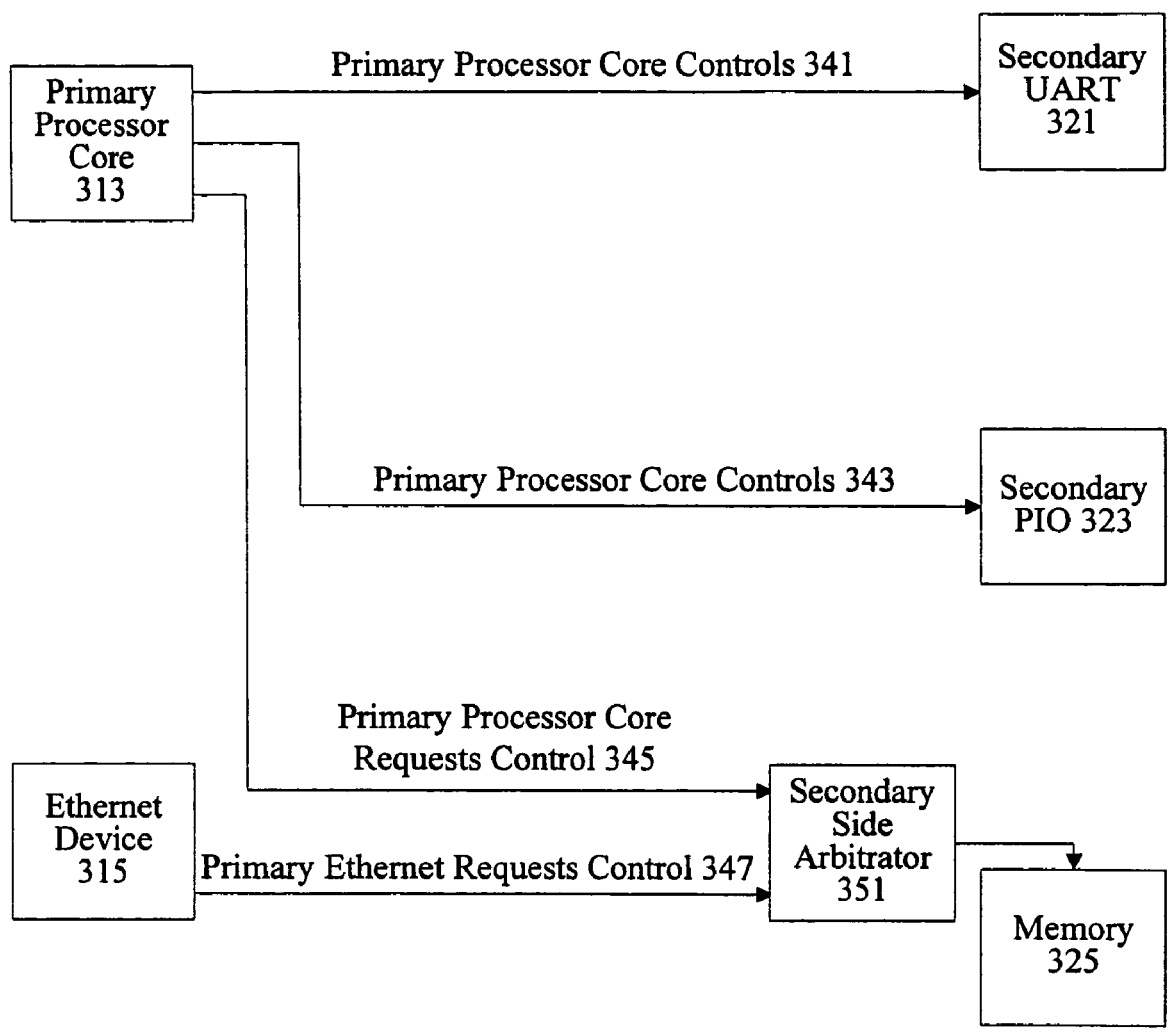
FIG. 3 is a diagrammatic representation showing a system having simultaneous multiple primary components.

FIG. 3 is a diagrammatic representation showing one example of a system using secondary side arbitration, sometimes referred to as slave side arbitration, simultaneous multiple primary components, or simultaneous multiple masters. Secondary side arbitration provides more data access efficiency than conventional bus architectures. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as memory 325 is associated with a secondary side arbitrator 351. However, secondary components UART 321 and PIO 323 are not associated with any arbitrator. In one example, secondary component UART 321 and secondary PIO 323 can only be accessed by primary processor core 313 and not by primary Ethernet device 315. A memory 325, however, can be accessed by both primary processor core 313 and primary Ethernet device 315.

According to various embodiments, a secondary side arbitrator 351 allows a first secondary component in a system to be accessed by a first primary component at the same time a second secondary component in the system is accessed by a second primary component. For example, memory 325 can be accessed by primary Ethernet 315 through secondary side arbitrator 351 at the same time, secondary UART 321 is accessed by primary processor core 313. By allowing a CPU to access a secondary component at the same time another primary component such as a streaming output device or an Ethernet component is accessing memory, bus bottlenecks can be reduced.

However, even though a secondary side arbitration system typically allows more rapid memory access, memory access can remain a significant efficiency limitation. For example, a processor core 313 needing to access a memory 325 frequently to perform a Fast Fourier Transform (FFT) would have to wait if an Ethernet device 315 were accessing the memory. Having to wait not only decreases processing speed, but also makes processing time unpredictable, a condition that is not acceptable for real-time or streaming type applications.

The techniques and mechanisms of the present invention recognize that in many instances, processor memory read access is particularly critical. For example, a typical DSP algorithm for a Finite Impulse Response (FIR) filter with 128-taps would store one output result for everyone 128 sample values and 128 coefficients read from memory. Consequently, the techniques and mechanisms of the present invention provide a tightly coupled dedicated memory read port to allow processor to rapidly perform a memory read access.

Figure 4:
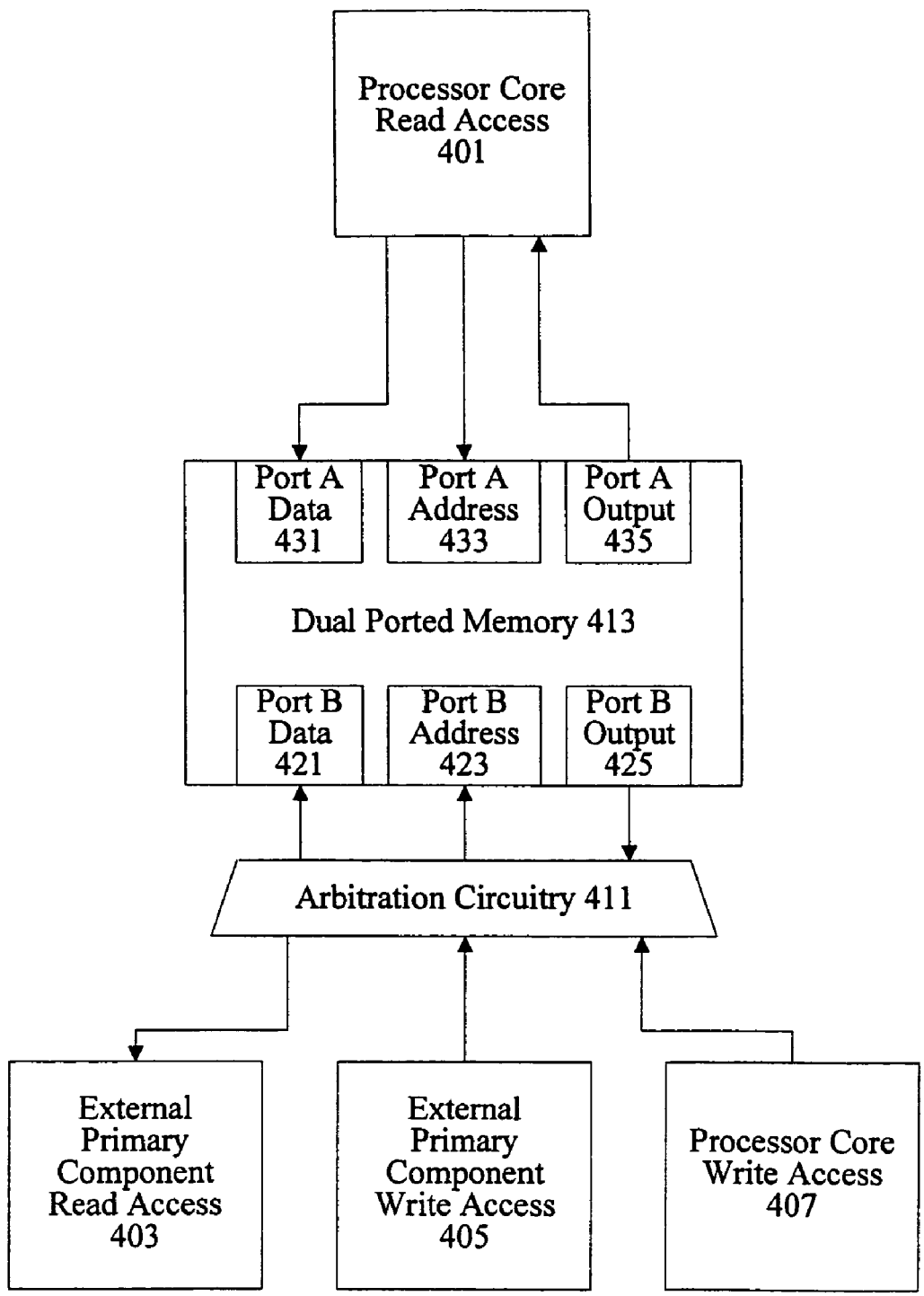
FIG. 4 is a diagrammatic representation showing a system on a programmable chip having a closely coupled memory.

FIG. 4 is a diagrammatic representation showing a dual ported memory 413. The dual ported memory 413 includes a port dedicated to processor read access 401. In one example, the data line to memory would not be connected if a processor is performing a read because an address would be provided on 433 and an output would be received on 435. The dual ported memory 413 also includes an arbitrated port shared by processor core write access 407 and external primary component read and write access 403 and 405. Any port configured specifically for processor core read access is referred to herein as a dedicated port or a dedicated read port. Any port shared between processor core write access and external component read and write access is referred to herein as an arbitrated port. In some examples, a dedicated port or a dedicated read port includes a data portion 431, and address portion 433, and an output portion 435. An arbitrated port includes a data portion 421, address portion 423, then output portion 425. If a processor core wishes to read values in the dual ported memory 413, processor core can immediately access data values using the dedicated port.

If the processor core wishes to write to the dual ported memory 413, the request is arbitrated using arbitration circuitry 411. According to various embodiments, arbitration circuitry 411 uses various fairness schemes such as round-robin in order to determine which component has access to a dual ported memory 413 at any given time. By providing a dual ported memory, a processor core can perform a read access of dual ported memory 413 while an external component is also performing a read access. In one example, the processor core may be given priority over external primary components in order to improve processor core efficiency in digital signal processing applications.

Figure 5:
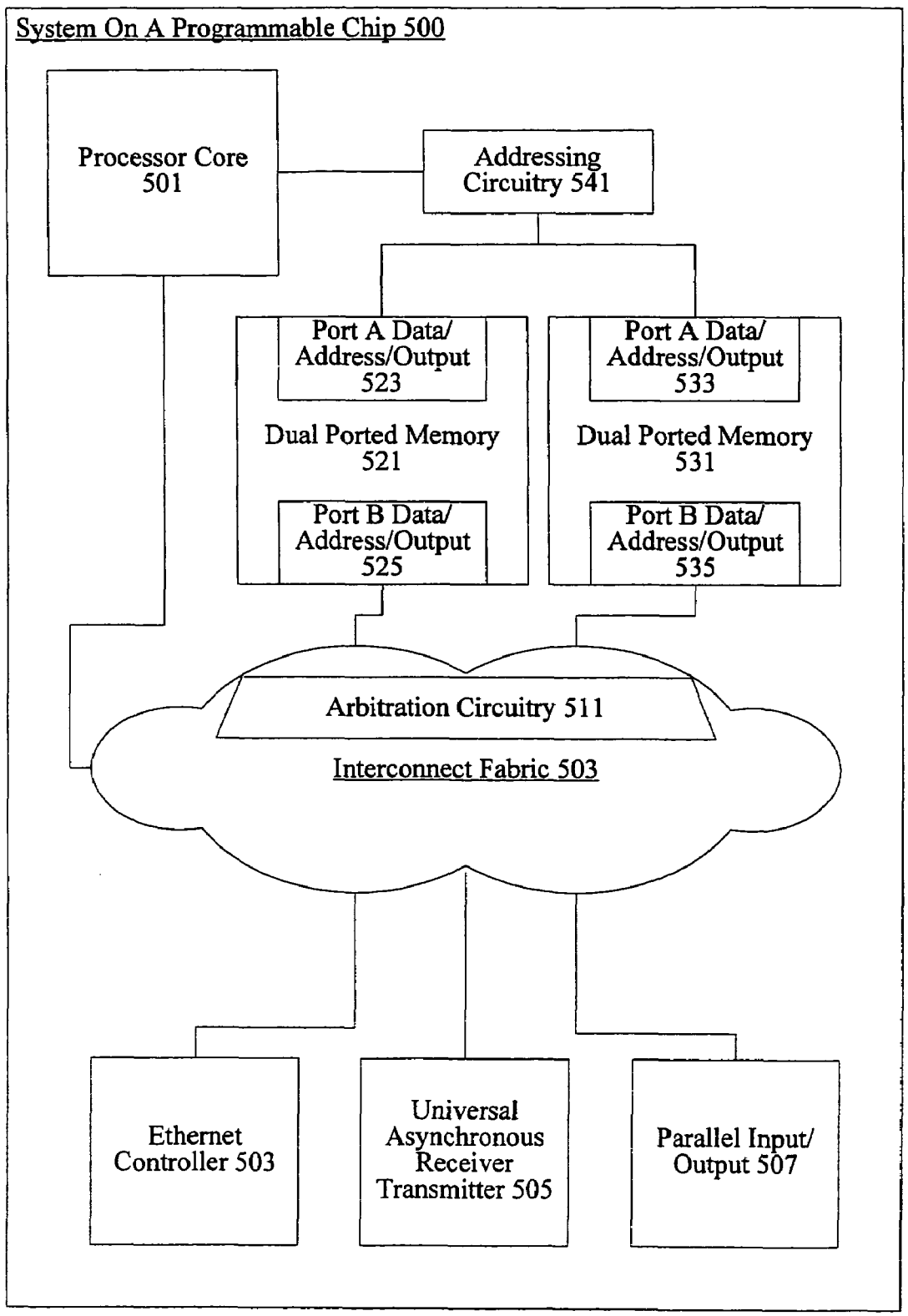
FIG. 5 is a diagrammatic representation showing a system on a programmable chip having a closely coupled memory implemented as multiple banks of memory.

FIG. 5 is a diagrammatic representation of one example of a system on a programmable chip 500. The programmable chip 500 includes a processor core 501 as well as an interconnection fabric 503. In one example, interconnection fabric 503 is a conventional bus as shown in FIG. 2. In another example the interconnection fabric 503 is a secondary side arbitration fabric as shown in FIG. 3. Interconnection fabric 503 or the interconnect fabric 503 includes arbitration circuitry 511 for determining which component can access the dual ported memory. In one example, the dual ported memory is implemented as two separate banks of memory 521 and 531. Memory 521 includes a dedicated port 523 as well as an arbitrated port 525. Dual ported memory 531 includes a dedicated port 533 and an arbitrated port 535.

According to various embodiments, the processor core is coupled to the two banks of dual ported memory through addressing circuitry 541. In some examples, the addressing circuitry 541 determines what bank of memory holds the data for fulfilling a particular read access request. The addressing circuitry 541 can use a variety of mechanisms in order to determine which dual ported memory includes a particular read access memory line. In one example, the addressing circuitry 541 looks at one or more bits of the read access request address in order to determine what dual ported memory the request should be forwarded to.

The dedicated ports 523 and 533 are dedicated to processor core reads. Arbitrated ports 525 and 535 are multiplexed between processor core writes and external master read and write accesses. According to various embodiments, dual ported memory 521 and dual ported memory 531 are arbitrated separately for efficiency. In some examples, separate arbitration allows an external master to access both dual ported memory 521 and dual ported memory 531 for read accesses as long as a processor core is not writing to memory 521 or 531. In another example, a processor core performs a dual read from dual ported memory 521 and dual ported memory 531 with a store to dual ported memory 521, while at the same time an external master is accessing dual ported memory 531 for either a read or a write. The processor core also can have priority maintained in arbitration circuitry 511 to allow a processor core to complete operation in the minimum number of cycles.

Figure 6:
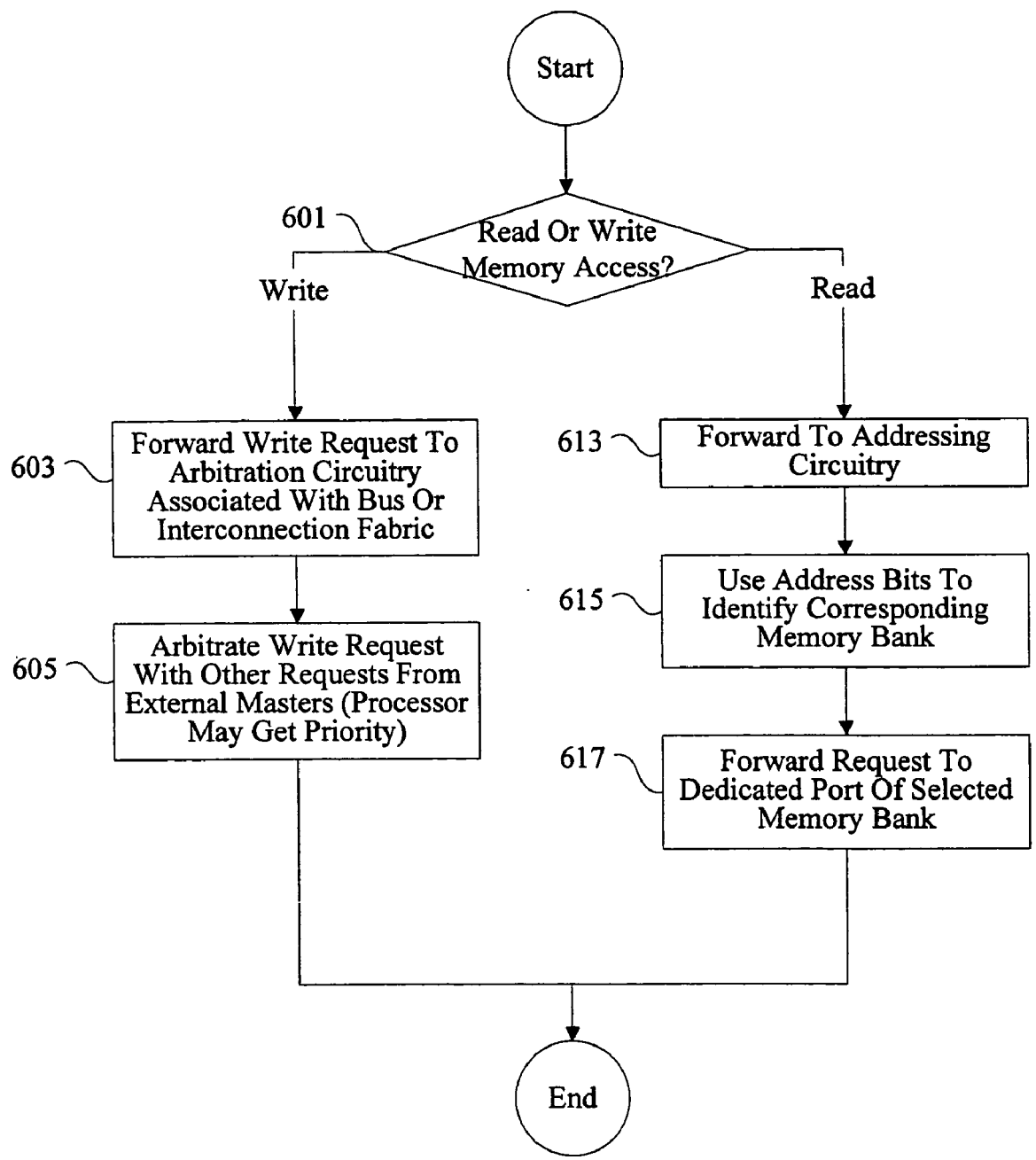
FIG. 6 is a flow process diagram showing a technique for accessing multiple banks of memory.

FIG. 6 is a flow process diagram showing one example of a memory access. At 601, it is determined if a read or write memory access is being performed. If the memory access is a read, the read access is forwarded to addressing circuitry 613. According to various embodiments, addressing circuitry is used to identify which one of a plurality of banks of memory is associated with a processor read request. In some examples, the addressing circuitry quickly identifies which bank of memory is appropriate by reading one or more of the most significant bits of an address. At 615, the address bits are used to identify the corresponding memory bank. In one example, a leading one in an address indicates that the request should be handled by a first bank of memory while a leading zero in an address indicates that the request should be handled by a second bank of memory. By determining the appropriate memory bank using leading bits in an address, read accesses can be rapidly performed.

Although address bits may be used, other mechanisms can also be used to identify an appropriate memory bank. In some examples, a processor may specify the memory bank to addressing circuitry. At 617, the request is forwarded to the dedicated port of the selected memory bank. According to various embodiments, the dedicated port of the selected memory bank is used exclusively to handle processor read accesses. No memory stalling is introduced. If the memory access request is a write, the write request is forwarded to arbitration circuitry associated with the bus or interconnection fabric at 603. The write request is then arbitrated with other requests from external masters at 605. According to various embodiments, the processor gets priority. However, in some instances the processor simply waits until an external masters such as an Ethernet component has finished accessing a particular memory bank. According to various embodiments, arbitration circuitry is associated with each memory bank to allow a write to a first memory bank while a write is also being performed on a second memory bank. By providing dual ported memory with a dedicated port, a variety of applications such as streaming and real-time applications can have substantially increased performance and predicatability.

According to various embodiments, the techniques and mechanisms of the present invention can be implemented on a variety of devices such as ASICs and programmable chips.

Figure 7:
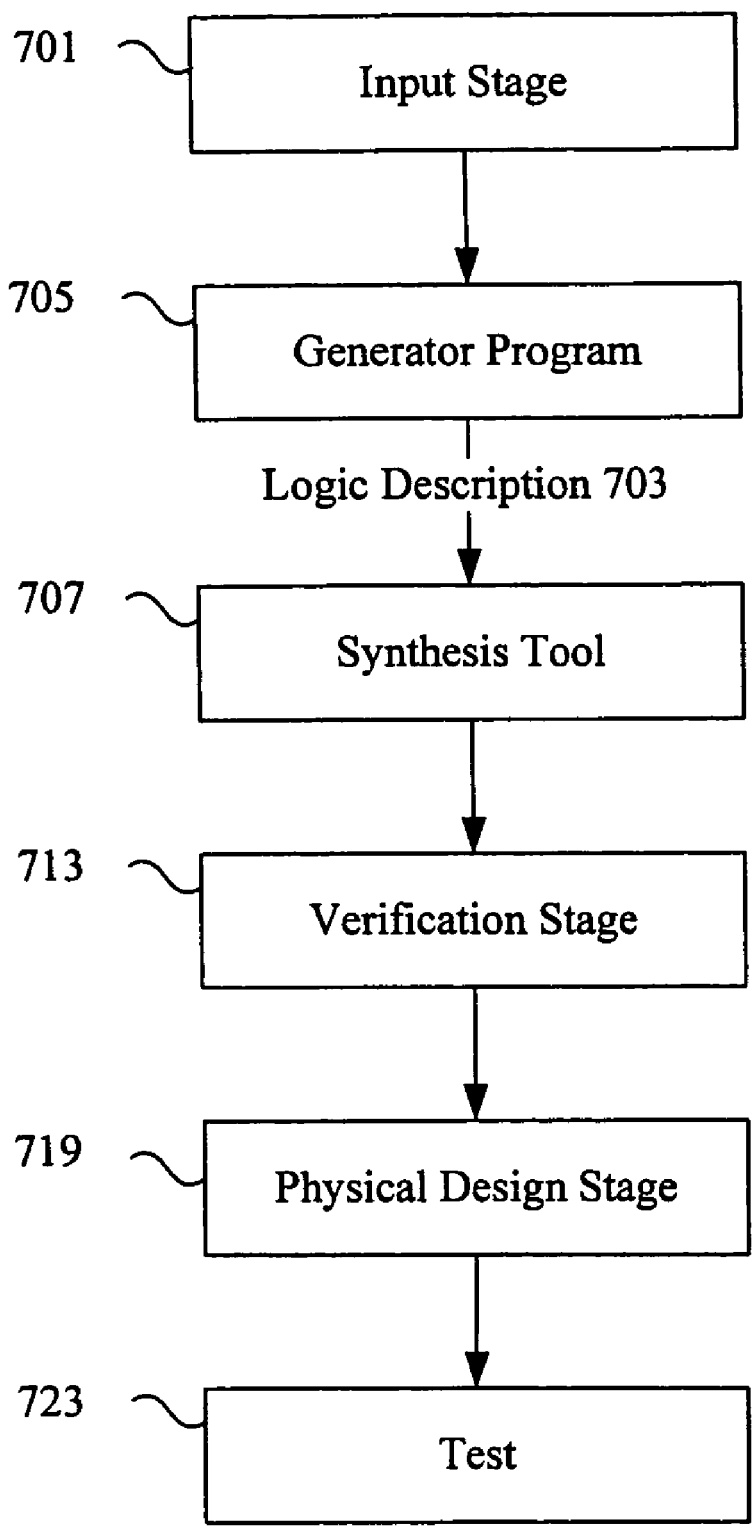
FIG. 7 is a diagrammatic representation showing implementation of a programmable chip.

FIG. 7 is a diagrammatic representation showing implementation of one example of a programmable chip. An input stage 701 receives selection information typically from a user for logic such as a processor core as well as other components such as a dual ported memory to be implemented on an electronic device. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. Selection of share or no share can be made. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. According to various embodiments, the generator program 705 also provides information to a synthesis tool 707 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 709.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
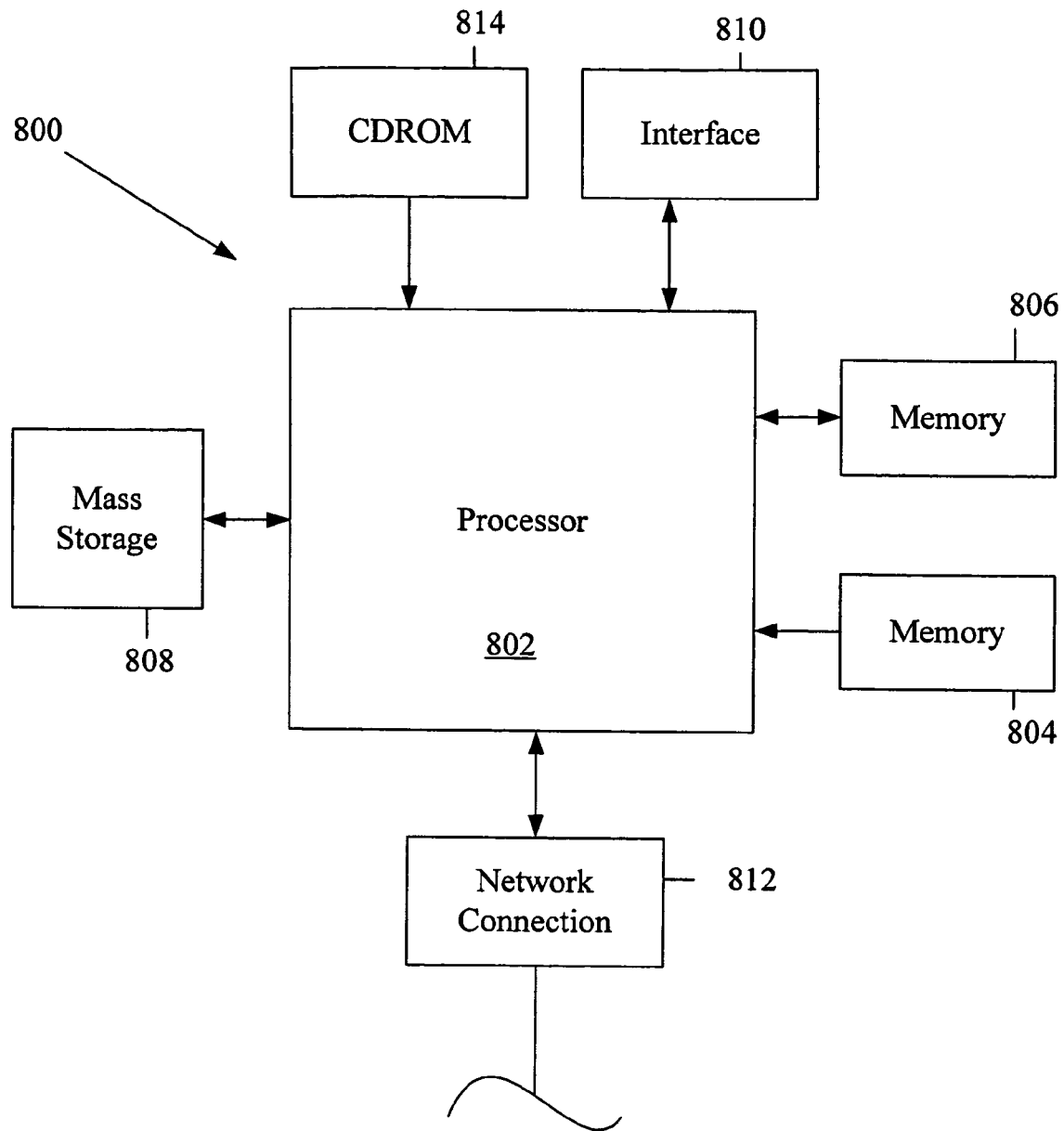
FIG. 8 is a diagrammatic representation of a system that can be used to implement the programmable chip.

FIG. 8 illustrates a typical computer system that can be used to implement a programmable chip having a dual ported memory with a dedicated read port. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 808 or 814 and executed on CPU 808 in conjunction with primary memory 806.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the present invention.

What is claimed is:

1. A system on a programmable chip, the system comprising:
   a processor core;
   a memory including a dedicated port and an arbitrated port, the dedicated port providing direct read access to memory by the processor core, the arbitrated port coupled to arbitration circuitry scheduling write access to memory by the processor core and read and write access to memory by an external primary component associated with the programmable chip.

2. The system of claim 1, wherein the processor core is operable to read data through the dedicated port while the external primary component is reading or writing data through the arbitrated port.

3. The system of claim 1, wherein arbitration circuitry comprises a simultaneous multiple primary component fabric.

4. The system of claim 1, wherein the memory comprises a first bank of dual ported memory and a second bank of dual ported memory each accessed across an internal bus.

5. The system of claim 4, wherein the first bank and the second bank each have dedicated ports for processor core read access and arbitrated ports for scheduling write access by the processor core and read and write access by the external primary component.

6. The system of claim 5, wherein the processor core is operable to perform a first processor core read of a first bank, a second processor core read of a second bank, and a first processor core write of a first bank while the external primary component is performing a first external primary component write of the second bank.

7. The system of claim 6, wherein a determination of first bank or second bank access is determined by identifying one or more memory address bits.

8. The system of claim 1, wherein the external primary component is an Ethernet controller.

9. The system of claim 1, wherein the external primary component is a component on the programmable chip.

10. The system of claim 1, wherein the processor core is a signal processing core.

11. The system of claim 1, wherein the programmable chip is operable to perform Digital Signal Processing (DSP) algorithms.

12. A method for accessing memory, the method comprising:
   performing a read access to a memory associated with a processor, the memory and the processor included on a programmable chip, the read access performed through a dedicated port, the dedicated port operable to provide direct read access to memory by the processor;
   performing a write access to memory associated with the processor, the write access performed through an arbitrated port, the arbitrated port coupled to arbitration circuitry scheduling write access by the processor and read and write access by an external primary component.

13. The method of claim 12, wherein the processor core is operable to read data through the dedicated port while the external primary component is reading or writing data through the arbitrated port.

14. The method of claim 12, wherein arbitration circuitry comprises a simultaneous multiple primary component fabric.

15. The method of claim 12, wherein the memory comprises a first bank of dual ported memory and a second bank of dual ported memory each accessed across an internal bus.

16. The method of claim 15, wherein the first bank and the second bank each have dedicated ports for processor core read access and arbitrated ports for scheduling write access by the processor core and read and write access by the external primary component.

17. The method of claim 16, wherein the processor core is operable to perform a first processor core read of a first bank, a second processor core read of a second bank, and a first processor core write of a first bank while the external primary component is performing a first external primary component write of the second bank.

18. The method of claim 17, wherein a determination of first bank or second bank access is determined by identifying one or more memory address bits.

19. The method of claim 12, wherein the external primary component is an Ethernet controller.

20. The method of claim 12, wherein the external primary component is a component on the programmable chip.

21. The method of claim 12, wherein the processor core is a signal processing core.

22. The method of claim 12, wherein the programmable chip is operable to perform Digital Signal Processing (DSP) algorithms.

23. An apparatus for accessing memory, the apparatus comprising:
   means for performing a read access to a memory associated with a processor, the memory and the processor included on a programmable chip, the read access performed through a dedicated port, the dedicated port operable to provide direct read access to memory by the processor;
   means for performing a write access to memory associated with the processor, the write access performed through an arbitrated port, the arbitrated port coupled to arbitration circuitry scheduling write access by the processor and read and write access by an external primary component.

24. The apparatus of claim 23, wherein the processor core is operable to read data through the dedicated port while the external primary component is reading or writing data through the arbitrated port.

25. The apparatus of claim 23, wherein arbitration circuitry comprises a simultaneous multiple primary component fabric.

26. The apparatus of claim 23, wherein the memory comprises a first bank of dual ported memory and a second bank of dual ported memory each accessed across an internal bus.

27. The apparatus of claim 26, wherein the first bank and the second bank each have dedicated ports for processor core read access and arbitrated ports for scheduling write access by the processor core and read and write access by the external primary component.

28. The apparatus of claim 27, the processor core is operable to perform a first processor core read of a first bank, a second processor core read of a second bank, and a first processor core write of a first bank while the external primary component is performing a first external primary component write of the second bank.

29. The apparatus of claim 28, wherein a determination of first bank or second bank access is determined by identifying one or more memory address bits.

* * * * *